(12) United States Patent
Gupta et al.

(10) Patent No.: US 11,169,940 B2
(45) Date of Patent: Nov. 9, 2021

(54) TRACE LENGTH ON PRINTED CIRCUIT BOARD (PCB) BASED ON INPUT/OUTPUT (I/O) OPERATING SPEED

(71) Applicant: QUALCOMM Incorporated, San Diego, CA (US)

(72) Inventors: Sunil Gupta, San Diego, CA (US); Scott Powers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/736,542

(22) Filed: Jan. 7, 2020

(65) Prior Publication Data

US 2020/0264991 A1 Aug. 20, 2020

Related U.S. Application Data

(60) Provisional application No. 62/808,219, filed on Feb. 20, 2019.

(51) Int. Cl.
*G06F 13/16* (2006.01)
*H05K 1/18* (2006.01)
*H05K 1/02* (2006.01)
*G06F 3/06* (2006.01)

(52) U.S. Cl.
CPC ........ *G06F 13/1668* (2013.01); *G06F 3/0613* (2013.01); *G06F 3/0653* (2013.01); *G06F 3/0673* (2013.01); *H05K 1/0242* (2013.01); *H05K 1/18* (2013.01); *H05K 2201/09218* (2013.01); *H05K 2201/10159* (2013.01)

(58) Field of Classification Search
None
See application file for complete search history.

(56) References Cited

U.S. PATENT DOCUMENTS

| | | | |
|---|---|---|---|
| 6,097,086 A * | 8/2000 | Crane, Jr. ............... | H01L 24/73 257/692 |
| 6,418,552 B1 | 7/2002 | Osborn | |
| 6,466,008 B1 | 10/2002 | Fung et al. | |
| 8,971,423 B1 * | 3/2015 | Fu ........................... | H03L 7/093 375/260 |
| 9,596,749 B2 * | 3/2017 | Chen ..................... | H05K 1/0242 |
| 10,714,072 B1 * | 7/2020 | Bodon ................. | H04R 1/1041 |
| 2003/0140274 A1 * | 7/2003 | Neumiller ................. | H04L 1/22 714/24 |
| 2006/0136857 A1 | 6/2006 | Felton | |

(Continued)

OTHER PUBLICATIONS

International Search Report and Written Opinion—PCT/US2020/012789—ISA/EPO—dated Apr. 22, 2020.

*Primary Examiner* — Henry Tsai
*Assistant Examiner* — Christopher A Bartels
(74) *Attorney, Agent, or Firm* — Qualcomm Incorporated

(57) ABSTRACT

A wireline communications system is described. The wireline communications system includes a printed circuit board (PCB). The wireline communications system also includes a system on chip (SoC) die on the PCB. The wireline communications system further includes an external memory device coupled to a memory interface of the SoC die. The external memory device is coupled to the memory interface of the SoC die through a PCB trace. A length of the PCB trace is configured according to an operating speed of the memory interface.

16 Claims, 7 Drawing Sheets

(56) References Cited

U.S. PATENT DOCUMENTS

| | | | |
|---|---|---|---|
| 2007/0030019 A1* | 2/2007 | Kinsley | G01R 31/2856 |
| | | | 324/750.07 |
| 2008/0287063 A1* | 11/2008 | Kidron | G10L 19/167 |
| | | | 455/41.2 |
| 2011/0265134 A1* | 10/2011 | Jaggi | H04N 21/440218 |
| | | | 725/109 |
| 2015/0058642 A1* | 2/2015 | Okamoto | G06F 13/14 |
| | | | 713/300 |
| 2016/0182154 A1* | 6/2016 | Fang | H04B 10/2575 |
| | | | 398/116 |
| 2016/0294585 A1* | 10/2016 | Rahman | H04L 25/08 |
| 2018/0191523 A1* | 7/2018 | Shah | H04B 3/36 |
| 2018/0220175 A1* | 8/2018 | Kang | H04N 21/8451 |
| 2019/0173582 A1* | 6/2019 | Ashrafi | H01Q 25/005 |
| 2019/0385057 A1* | 12/2019 | Litichever | G06N 3/08 |
| 2020/0091608 A1* | 3/2020 | Alpman | H01Q 1/526 |
| 2020/0105318 A1* | 4/2020 | Mobin | G11C 7/1006 |
| 2020/0212943 A1* | 7/2020 | Banin | H04L 25/49 |

* cited by examiner

Reflected wave propagation when total-trace-length=1.0*UI (~35 mm)

Reflected wave propagation when total-trace-length=0.5*UI (~17.5 mm)

TRACE LENGTH ON PRINTED CIRCUIT BOARD (PCB) BASED ON INPUT/OUTPUT (I/O) OPERATING SPEED

CROSS-REFERENCE TO RELATED APPLICATION

The present application claims the benefit of U.S. Provisional Patent Application No. 62/808,219, filed Feb. 20, 2019, and titled "TRACE LENGTH ON PRINTED CIRCUIT BOARD (PCB) BASED ON INPUT/OUTPUT (I/O) OPERATING SPEED," the disclosure of which is expressly incorporated by reference herein in its entirety.

TECHNICAL FIELD

The present disclosure relates generally to integrated communications systems, and more specifically, to an improved trace length on a printed circuit board based on input/output (I/O) speed.

BACKGROUND

Electrical connections exist at each level of a system hierarchy. This system hierarchy includes interconnection of active devices at a lowest system level all the way up to system level interconnections at the highest level. For example, interconnect layers can connect different devices together on an integrated circuit. As integrated circuits become more complex, more interconnect layers are used to provide the electrical connections between the devices. More recently, the number of interconnect levels for circuitry has substantially increased due to the large number of devices that are now interconnected in a modern electronic device. The increased number of interconnect levels for supporting the increased number of devices involves more intricate processes.

These interconnect layers may provide transmission line structures for interconnecting integrated circuit (IC) devices in high frequency circuit designs. For example, high frequency circuit designs may use a transmission line (e.g., a trace) for supporting high speed interfaces. These high speed interfaces may enable point-to-point (e.g., serial) communications links for high speed serial communications designs.

Traditional interconnect traces are fabricated on a printed circuit board (PCB) to enable communications between devices on the PCB. For example, a system on chip (SoC) die may communicate with an external memory (e.g., a dynamic random access memory (DRAM)) over a trace on the PCB. In particular, the PCB trace may interconnect an SoC package to a memory (e.g., DRAM) package on the PCB. Conventionally, PCB trace lengths are designed to be minimal in length ("standard trace length"), which can lead to poor signal integrity. A design for PCB trace lengths having superior signal integrity is desired.

SUMMARY

A wireline communications system is described. The wireline communications system includes a printed circuit board (PCB). The wireline communications system also includes a system on chip (SoC) die on the PCB. The wireline communications system further includes an external memory device coupled to a memory interface of the SoC die. The external memory device is coupled to the memory interface of the SoC die through a PCB trace. A length of the PCB trace is configured according to an operating speed of the memory interface.

A method for determining an improved printed circuit board (PCB) trace length of a wireline communications system is described. The method includes determining a signal propagation length covered in a predetermined time duration based on an input/output operation speed of a memory interface. The method also includes determining a signal speed according to a material of a printed circuit board (PCB) or a package material. The method further includes computing a total trace length according to the signal speed and the signal propagation length. The method also includes determining the improved PCB trace length based on the total trace length minus an SoC package trace length and a memory package trace length.

A wireline communications system is described. The wireline communications system includes a printed circuit board (PCB). The wireline communications system also includes a system on chip (SoC) die on the PCB. The wireline communications system further includes an external memory device coupled to a memory interface of the SoC die. The external memory device is coupled to the memory interface of the SoC die through a signal integrity channel. A length of the signal integrity channel is configured according to an operating speed of the memory interface.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
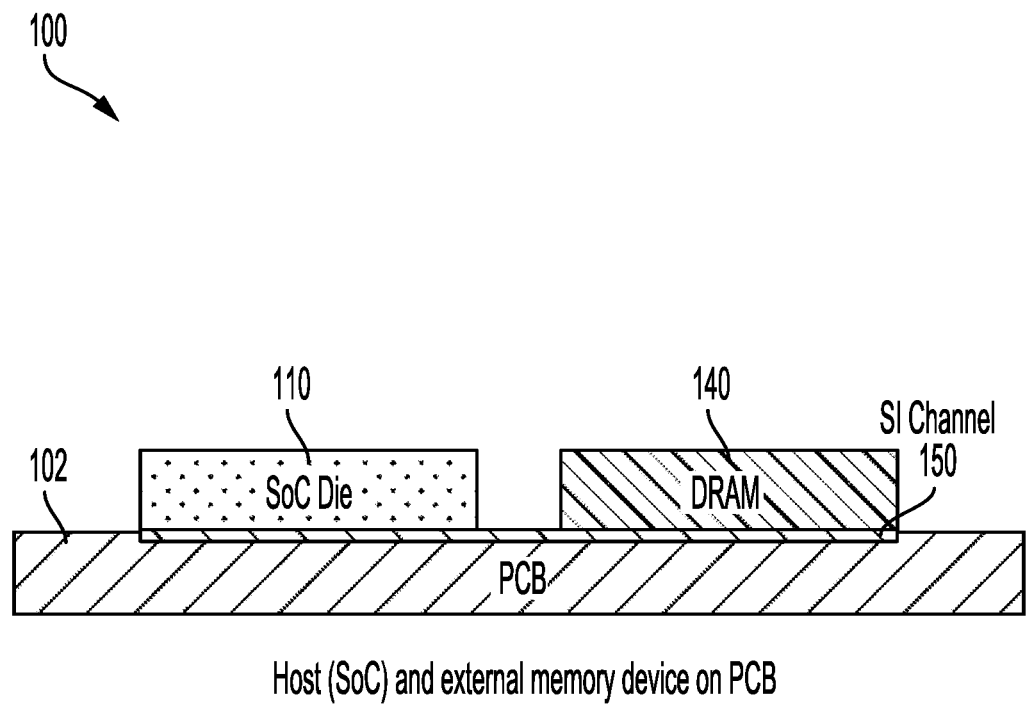
FIG. 1 is a block diagram of a memory sub-system illustrating a host system on chip (SoC) die communicably coupled to an external memory device in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As described herein, the use of the term "and/or" is intended to represent an "inclusive OR", and the use of the term "or" is intended to represent an "exclusive OR". As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations.

Electrical connections exist at each level of a system hierarchy. In particular, interconnect layers connect different devices together on an integrated circuit (IC). As integrated circuits become more complex, more interconnect layers are used to provide the electrical connections between these devices. More recently, the number of interconnect levels for circuitry has substantially increased due to the large number of devices that are now interconnected in modern mobile electronic devices. The increased number of interconnect levels for supporting the increased number of devices involves more intricate processes.

These interconnect layers may provide transmission line structures for interconnecting integrated circuit (IC) devices in high frequency circuit designs. For example, high frequency circuit designs may use a transmission line (e.g., a trace) for supporting high speed interfaces. These high speed interfaces may enable point-to-point (e.g., serial) communications links for high speed serial communications designs.

Traditional interconnect traces are fabricated on a printed circuit board (PCB) to enable communications between devices on the PCB. For example, a system on chip (SoC) die may communicate with an external memory (e.g., a dynamic random access memory (DRAM)) over a trace on the PCB. In particular, the PCB trace may interconnect an SoC package to a memory (e.g., DRAM) package on the PCB. Conventionally, PCB trace lengths are designed to be minimal in length, which can lead to poor signal integrity. Designs for PCB trace lengths having superior signal integrity are desired.

Various aspects of the disclosure provide an improved trace length on a PCB based on an input/output (I/O) speed of a corresponding external device interface. It will be understood that the term "layer" includes film and is not to be construed as indicating a vertical or horizontal thickness unless otherwise stated. As described herein, the term "substrate" may refer to a substrate of a diced wafer or may refer to a substrate of a wafer that is not diced. Similarly, the terms "chip" and "die" may be used interchangeably unless such interchanging would tax credulity.

A transmission line (e.g., a PCB trace) may be used for interconnection as well as power delivery. These on-chip transmission lines, unfortunately, operate in a mismatched termination environment, which causes reflections based on inter-symbol-interference (ISI). Reflections due to ISI are dependent upon a total PCB trace length. In the SoC and external memory device example provided above, the total PCB trace length is the sum of an SoC package trace length, a PCB trace length, and a memory package trace length. Generally, the SoC package trace length and the memory package trace length are constant and estimated according to the package type.

By contrast, the PCB trace length may vary between high speed designs. Conventional wisdom dictates that PCB trace lengths should be designed according to a minimum length. Unfortunately, designing PCB traces with a minimum length generally can lead to poor signal integrity. Designs for PCB trace lengths yielding superior signal integrity are described. According to aspects of the present disclosure, an improved trace length on a PCB is determined based on an input/output (I/O) speed of an associated external device interface, such as a memory interface.

FIG. 1 is a block diagram of a memory sub-system 100 illustrating a host system on chip (SoC) die communicably coupled to an external memory device in accordance with aspects of the present disclosure. FIG. 1 shows a side view of a low power memory sub-system illustrating an SoC die 110 (e.g., a host SoC die) coupled to an external memory device 140 on a printed circuit board (PCB) 102, in accordance with aspects of the present disclosure. This aspect of the present disclosure applies an input/output speed based selection of an improved PCB trace length as a memory link. This example relates to next generation low power double data rate (DDR) (e.g., low power double data rate (LPDDR)) interface implementation in mobile or computing system chipsets. The PCB trace of a signal integrity channel 150 (SI) between the SoC die 110 and the external memory device 140 is further illustrated in FIG. 2.

Figure 2:
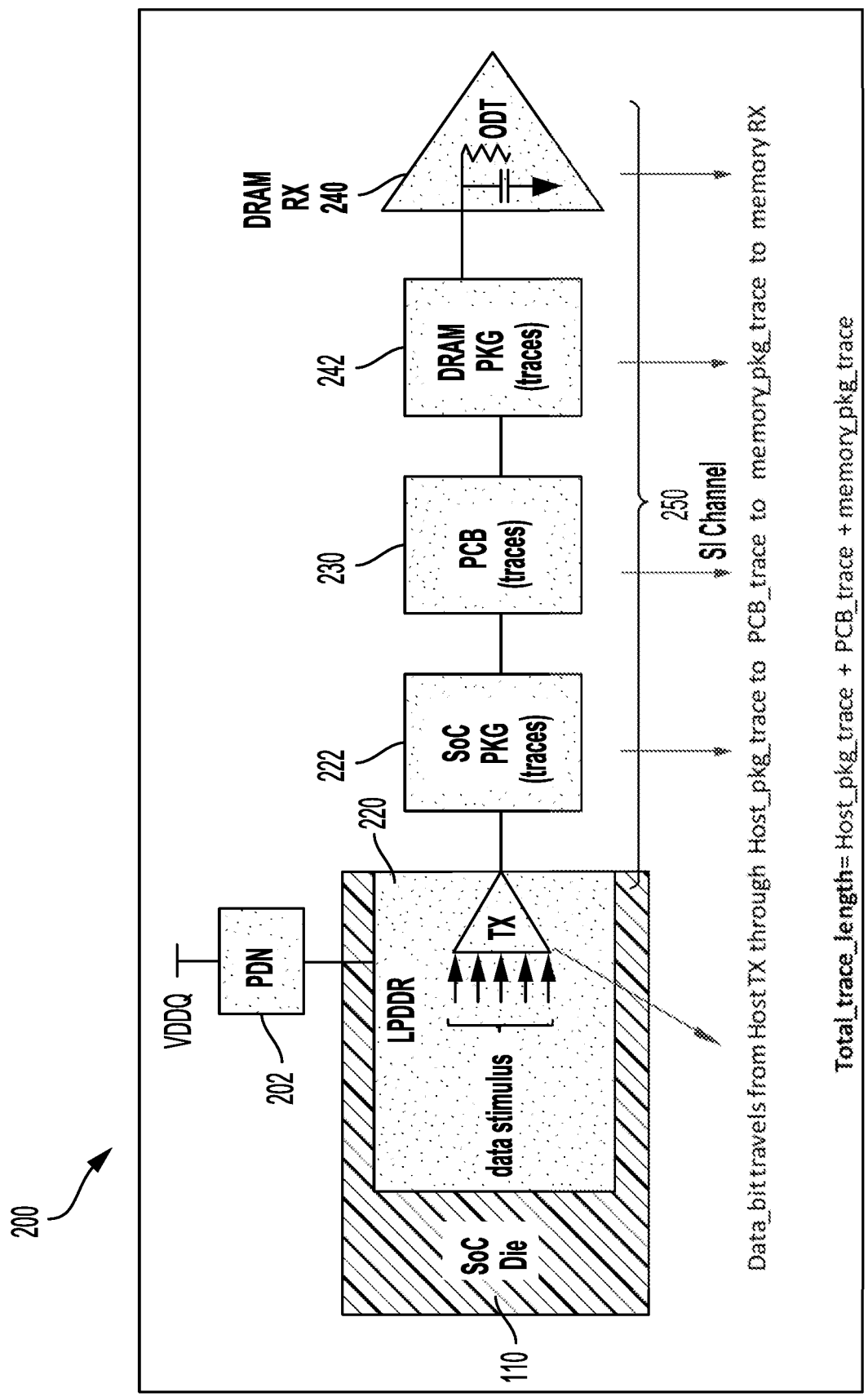
FIG. 2 is a schematic diagram further illustrating the memory sub-system of FIG. 1 to show an improved total printed circuit board (PCB) trace length of a transmission line structure, according to aspects of the present disclosure.

FIG. 2 is a schematic diagram 200 further illustrating the memory sub-system of FIG. 1 to show an improved printed circuit board (PCB) trace length of a transmission line structure, according to aspects of the present disclosure. Representatively, the SoC die 110 includes a memory interface 220 (e.g., an LPDDR (4/4×/5) interface) for communicating between the SoC die 110 and the external memory device (e.g., a dynamic random access memory (DRAM) receiver (RX)) 240. Although shown as a volatile DRAM memory, it should be recognized the external memory device may be composed of a volatile memory device and/or a non-volatile memory (NVM) device (e.g., NAND/NOR based flash memory).

In this configuration, the SoC die 110 is coupled to a power distribution network (PDN) 202. In this example, the external memory device 140 of FIG. 1 is shown as DRAM RX (e.g., memory RX 240), which is communicably coupled to the memory interface 220 of the SoC die 110. The memory RX 240 is communicably coupled to the memory interface 220 through an SoC package trace (e.g., SoC PKG trace 222), a PCB trace 230, and a memory (e.g., DRAM) PKG trace 242. In this example, the SoC PKG trace 222, the PCB trace 230, and the memory PKG trace 242 are referred to collectively as a signal-integrity (SI) channel 250.

In this example, the memory interface 220 for communicating between the SoC die 110 and the external memory device 140 (e.g., memory RX 240) runs at a high operating speed (e.g., 2133/3200 MHz I/O operating speeds). The memory interface 220, unfortunately, operates in a mismatched termination environment, which causes reflections based on inter-symbol-interference (ISI). Reflections due to ISI are dependent upon a total PCB trace length of the SI channel 250.

In operation, data (or stimulus) from the memory interface 220 travels from the transmitter (TX) of the memory interface 220 through the SoC PKG trace 222 to the PCB trace 230 to the memory PKG trace 242 to the memory RX 240. In this example, the memory RX 240 includes on-die termination (ODT). Hence, the total trace length is a sum of the lengths of the SoC PKG trace 222, the PCB trace 230, and the memory PKG trace 242, which are collectively shown as the SI channel 250. Generally, the length of the SoC PKG trace 222 and the length of the memory PKG trace 242 are constant and estimated according to the corresponding package type.

By contrast, a length of the PCB trace 230 may vary between high speed designs. Conventional wisdom dictates the length of the PCB trace 230 is designed according to a minimum length. Unfortunately, designing the PCB trace 230 with a minimum length generally can lead to poor signal integrity. A method for designing the length of the PCB trace 230 yielding superior signal integrity is described. According to aspects of the present disclosure, an improved trace length of PCB trace 230 is determined based on an input/output (I/O) speed of, for example, the memory interface 220, as further illustrated in the process shown in FIG. 3.

Figure 3:
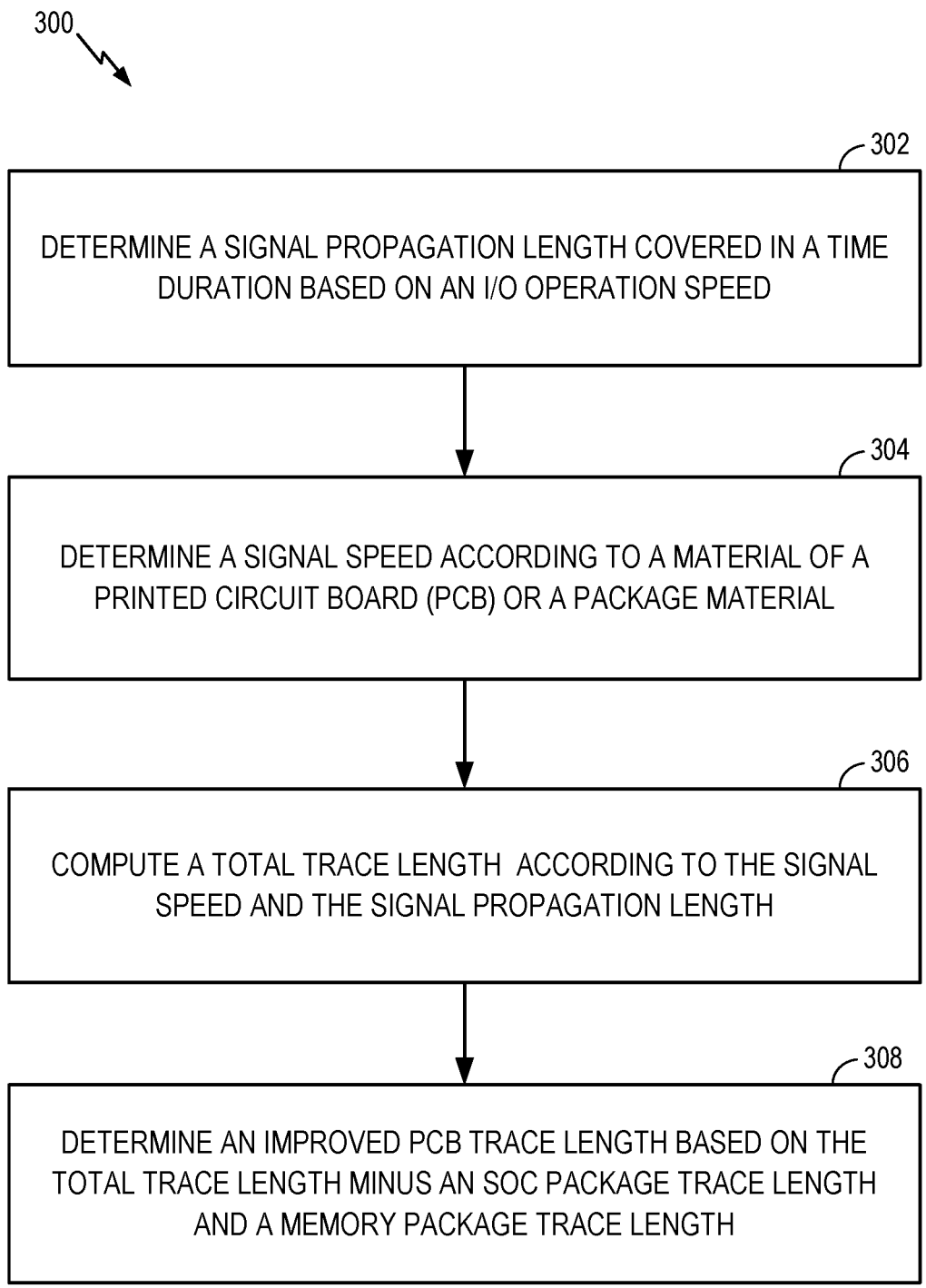
FIG. 3 is a process flow diagram illustrating a method for determining an improved PCB trace length based on an input/output (I/O) operating speed of a corresponding interface, according to an aspect of the present disclosure.

FIG. 3 is a process flow diagram illustrating a method 300 for determining an improved PCB trace length based on an I/O operating speed of a corresponding interface of a wireline communications system, according to an aspect of the present disclosure. In block 302, a signal propagation length covered in a predetermined time duration is determined. According to aspects of the present disclosure, an improved trace length may be determined according to a signal propagation length covered during the predetermined duration, as follows:

$$\text{total\_trace\_length} = \text{signal propagation length in time duration of } 2.0*\text{I/O speed}. \quad (1)$$

For example, assuming an operation frequency (e.g., I/O speed) of 2133 MHz, then according to Equation (1), 2.0*I/O speed equals 4266 MHz, which yields a time duration of 1/4266 or 234 picoseconds (ps), which equals 1 unit interval (UI) of the signal propagation length. In block 304, a signal speed is determined according to a material of a printed circuit board (PCB) or a package material. For example, as shown in FIGS. 1 and 2, the PCB 102/230 is composed of an FR4 material, but may be composed of other like dielectric materials. The signal speed in FR4 material of the PCB 102/230 is 0.15 mm/ps=0.5*speed of light, which is a standard value.

Equation (1) may be determined based on the understanding of the signal propagation in transmission traces. Signal propagation in transmission traces is based on distance traversed in one unit interval of a data bit. Signal behavior is modified due to impedance changes from source to trace to destination loads and back to trace to source and trace. This signal behavior modification caused by impedance affects the distance traversed by the signal. In addition, reflected waves also interact with a source data stream. These various factors contributed to formation of Equation (1), which is validated by extensive simulation of a real system for various lengths of transmission trace.

In block 306, a total trace length is computed according to the signal speed and the signal propagation length. For example, a best-case signal integrity is the signal propagation length according to the determined signal speed (=~0.15 mm/ps*234 ps=35 mm). By contrast, a worst-case signal integrity is generally determined as half of the improved trace length (=35 mm*0.5=17.5 mm). In block 308, an improved PCB trace length is computed based on the total trace length minus an SoC package trace length and a memory package trace length. For example, as shown in FIG. 2, the length of the SoC PKG trace 222 and length of the memory PKG trace 242 are subtracted from the total trace length to set the length of the PCB trace 230.

Figure 4A:
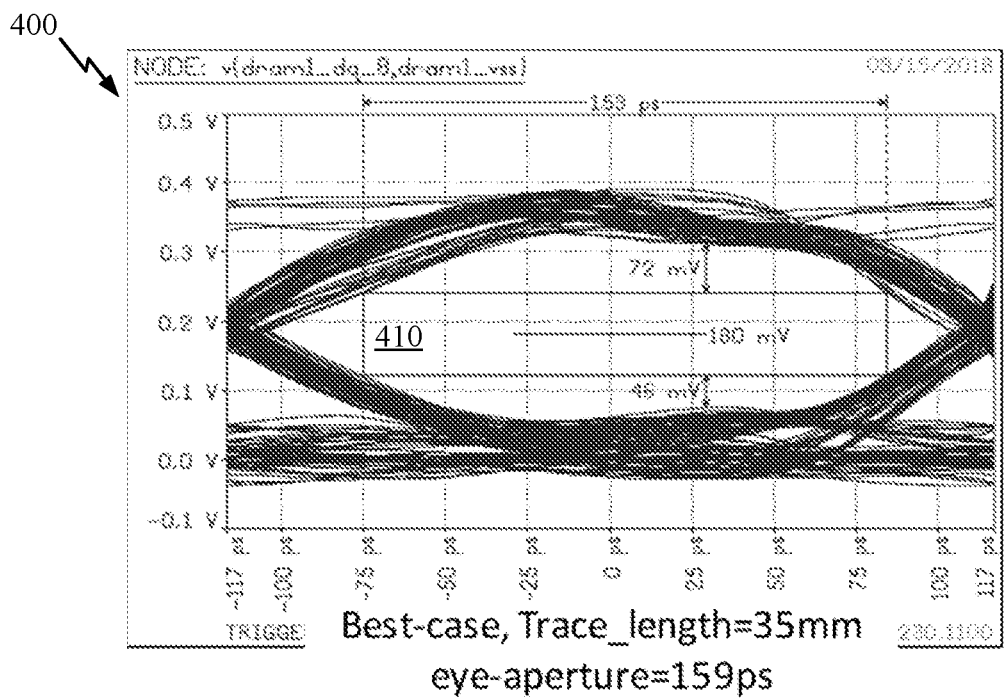
FIGS. 4A and 4B are diagrams illustrating a best-case signal integrity and a worst-case signal integrity, according to aspects of the present disclosure.
Figure 4B:
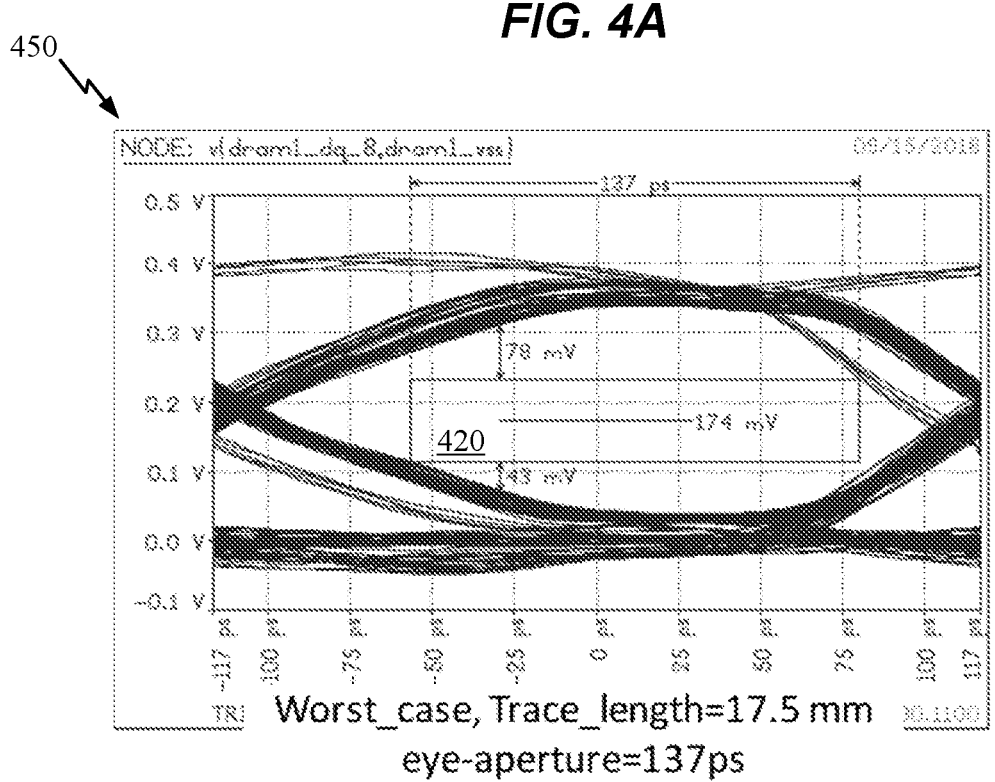

FIGS. 4A and 4B are diagrams illustrating a best-case signal integrity and a worst-case signal integrity, according to aspects of the present disclosure. In particular, FIG. 4A is a diagram 400, illustrating a trace length of 35 mm, which was computed above as the improved total trace length. This trace length yields an eye-aperture 410 of 159 ps. By contrast, FIG. 4B is a diagram 450, illustrating a trace length of 17.5 mm, which was computed above as the worst-case total trace length. This trace length yields an eye-aperture 420 of 137 ps. As should be recognized, the eye-aperture 410 of 159 ps for the best-case signal integrity substantially exceeds the eye-aperture 420 of 137 ps for the worst-case signal integrity.

Figure 5A:
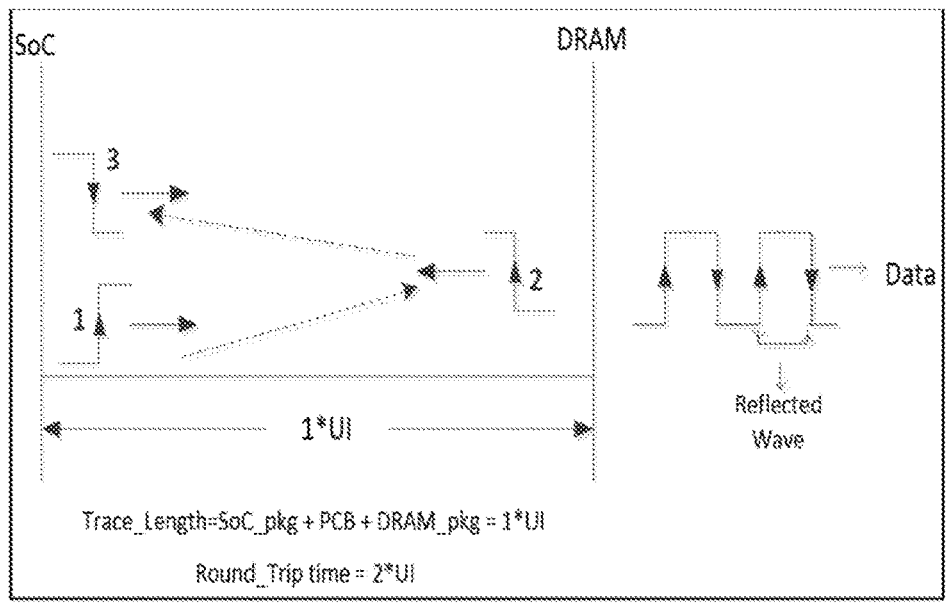
FIGS. 5A and 5B are diagrams illustrating reflected wave propagation for a best-case signal integrity and a worst-case signal integrity, according to aspects of the present disclosure.
Figure 5B:
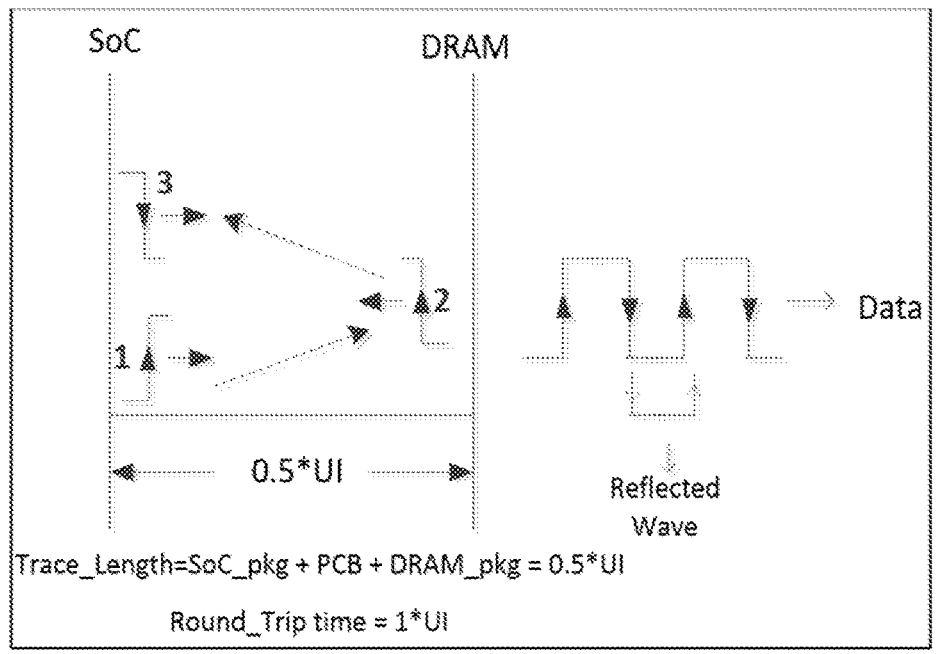

FIGS. 5A and 5B are diagrams illustrating reflected wave propagation for a best-case signal integrity and a worst-case signal integrity, according to aspects of the present disclosure. In particular, FIG. 5A illustrates reflected wave propagation for a trace length of ~35 mm, which was computed above as the improved total trace length. This trace length yields an eye-aperture of 159 ps. In this example, the rising edge starts at "1," reflects at "2," and then reflects and inverts at "3." The reflected wave lands after the round-trip delay of 2.0*UI [2*(1.0*UI)] at the data bit stream as shown. The reflected pulse is attenuated due to longer distance traversed, and its impact is greatly reduced due to the data pulse going in the opposite direction. This scenario leads to best-case eye-aperture, as shown in FIG. 4A, and yields Equation (1).

By contrast, FIG. 5B illustrates a trace length of ~17.5 mm, which was computed above as the worst-case total trace length. This trace length yields an eye-aperture of 137 ps. In this example, the rising edge originates at "1", traverses 0.5*UI trace length, and reflects back at "2." Then the signal traverses back the 0.5*UI trace length and reflects and inverts at "3." The reflected wave lands after the round-trip delay of 1.0*UI [2*(0.5*UI)] at the data bit stream as shown. The reflected pulse direction aligns with the data pulse direction. This inter-symbol interference (ISI) severely impacts the signal integrity. This scenario leads to the worst-case eye-aperture, as shown in FIG. 4B, and illustrates that half of the improved PCB trace length yields worst-case results.

Using an improved PCB trace length, according to aspects of the present disclosure, leads to superior signal integrity and thus extra timing margin, which can help with loosening design constraints while saving power. For example, using the described PCB trace length enables increased cross-talk resistance. This increased cross-talk resistance enables decreasing of trace spacing from a standard trace spacing on the PCB, which saves area. In addition, the improved PCB trace length decreases an on-die de-capacitance (decap), which saves active area, which is expensive; however, decreasing the on-die decap degrades the power delivery network (PDN), resulting in a degraded eye-aperture and degraded timing margin. The improved PCB trace length also allows forgoing of pre-emphasis, which saves power but introduces more jitter and consumes timing margin. Furthermore, the improved PCB trace length enables lowering of an I/O drive-strength of the memory interface, which saves power.

According to aspects of the present disclosure, a wireline communications system is described. The wireline communications system includes a printed circuit board (PCB). The wireline communications system also includes a system on chip (SoC) die on the PCB. The wireline communications system further includes an external memory device coupled to a memory interface of the SoC die. The external memory device is coupled to the memory interface of the SoC die through a means for transmitting a signal. A length of the signal transmitting means is configured according to an operating speed of the memory interface. The signal transmitting means may, for example, include the signal integrity channel 250, as shown in FIGS. 1 and 2. In another aspect, the aforementioned means may be any layer, module, or any apparatus configured to perform the functions recited by the aforementioned means.

Figure 6:
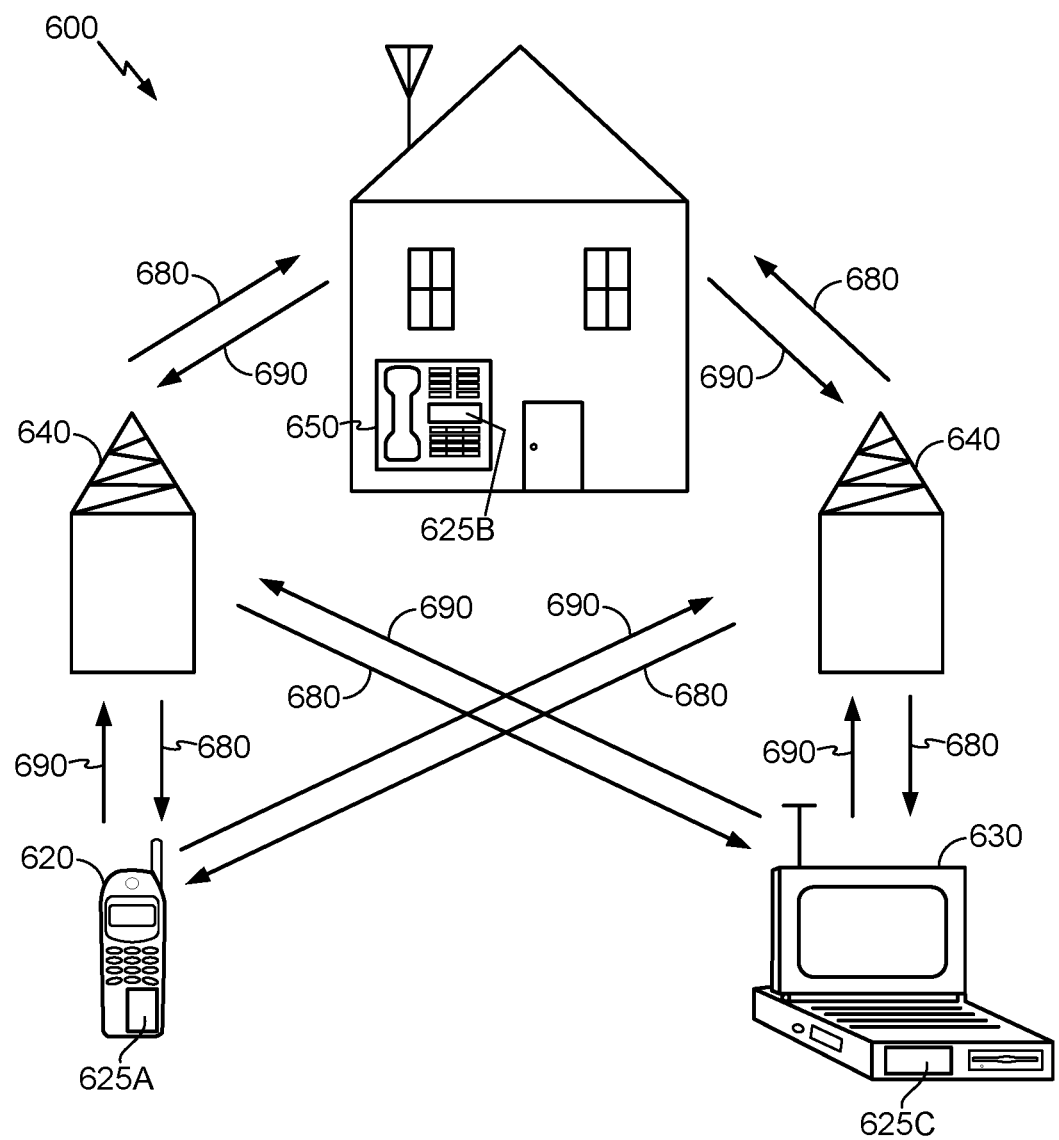
FIG. 6 is a block diagram showing an exemplary wireless communications system in which a configuration of the disclosure may be advantageously employed.

FIG. 6 is a block diagram showing an exemplary wireless communications system 600 in which an aspect of the disclosure may be advantageously employed. For purposes of illustration, FIG. 6 shows three remote units 620, 630, and 650 and two base stations 640. It will be recognized that wireless communications systems may have many more remote units and base stations. Remote units 620, 630, and 650 include IC devices 625A, 625C, and 625B that include the disclosed improved PCB trace length. It will be recognized that other devices may also include the disclosed improved PCB trace length, such as the base stations, switching devices, and network equipment. FIG. 6 shows forward link signals 680 from the base station 640 to the remote units 620, 630, and 650 and reverse link signals 690 from the remote units 620, 630, and 650 to base stations 640.

In FIG. 6, remote unit 620 is shown as a mobile telephone, remote unit 630 is shown as a portable computer, and remote unit 650 is shown as a fixed location remote unit in a wireless local loop system. For example, the remote units may be a mobile phone, a hand-held personal communications systems (PCS) unit, a portable data unit, such as a personal data assistant, a GPS enabled device, a navigation device, a set top box, a music player, a video player, an entertainment unit, a fixed location data unit, such as meter reading equipment, an automotive electronic system, or other device that stores or retrieves data or computer instructions, or combinations thereof. Although FIG. 6 illustrates remote units according to aspects of the present disclosure, the disclosure is not limited to these exemplary illustrated units. Aspects of the present disclosure may be suitably employed in many devices, which include the disclosed improved PCB trace length.

Figure 7:
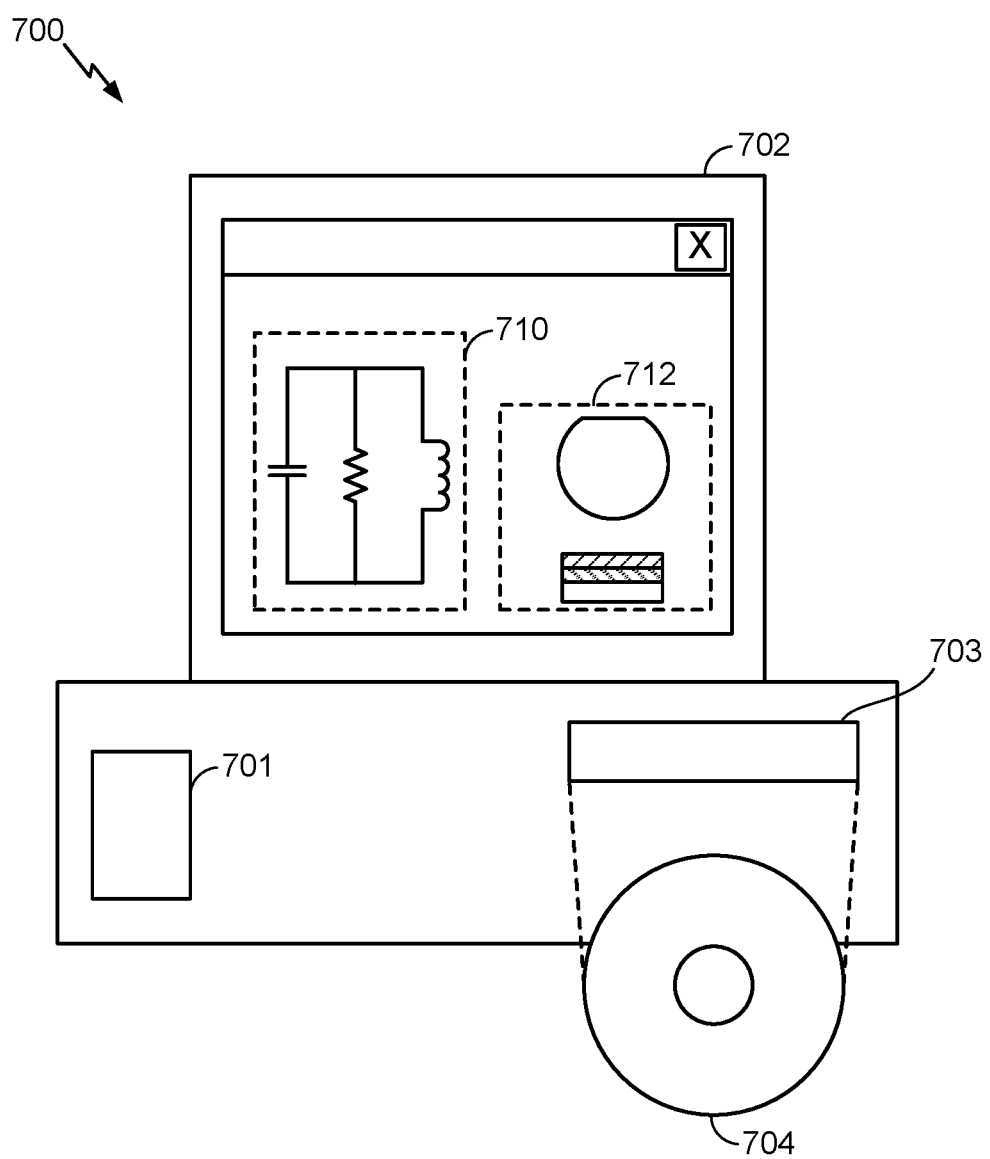
FIG. 7 is a block diagram illustrating a design workstation used for circuit, layout, and logic design of a semiconductor component according to one configuration.

FIG. 7 is a block diagram illustrating a design workstation used for circuit, layout, and logic design of a semiconductor component, such as the improved PCB trace length disclosed above. A design workstation 700 includes a hard disk 701 containing operating system software, support files, and design software such as Cadence or OrCAD. The design workstation 700 also includes a display 702 to facilitate design of a circuit 710 or a PCB trace 712. A storage medium 704 is provided for tangibly storing the design of the circuit 710 or the PCB trace 712. The design of the circuit 710 or the PCB trace 712 may be stored on the storage medium 704 in a file format such as GDSII or GERBER. The storage medium 704 may be a CD-ROM, DVD, hard disk, flash memory, or other appropriate device. Furthermore, the design workstation 700 includes a drive apparatus 703 for accepting input from or writing output to the storage medium 704.

Data recorded on the storage medium 704 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 704 facilitates the design of the circuit 710 or the PCB trace 712 by decreasing the number of processes for designing semiconductor wafers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communications media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A wireline communications system, comprising: a printed circuit board (PCB);
a system on chip (SoC) die on the PCB; and
an external memory device coupled to a memory interface of the SoC die through a PCB trace, a length of the PCB trace is configured according to an operating speed of the memory interface; wherein said length of the PCB trace is configured to be propagation length in time duration of two times the operating speed of the external memory interface.

2. The wireline communications system of claim 1, in which the memory interface comprises a low power double data rate (LPDDR) memory interface.

3. The wireline communications system of claim 1, in which the external memory device comprises a volatile memory device and/or a non-volatile memory (NVM) device.

4. The wireline communications system of claim 1, integrated into a mobile phone, a set top box, a music player, a video player, an entertainment unit, a navigation device, a computer, a hand-held personal communications systems (PCS) unit, a portable data unit, a fixed location data unit, and/or an automotive electronic system.

5. A method for determining an improved printed circuit board (PCB) trace length of a wireline communications system, comprising:
   determining a time duration based on an input/output operation speed of a memory interface;
   determining a signal speed according to a material of a printed circuit board (PCB) or a package material;
   computing a total trace length according to the signal speed and the time duration, wherein the total trace length is a signal propagation length in the time duration; and
   determining the improved PCB trace length based on the total trace length minus an SoC package trace length and a memory package trace length.

6. The method of claim 5, further comprising determining a worst-case signal integrity when the total trace length is one-half of the total trace length.

7. The method of claim 5, further comprising decreasing a trace spacing of traces on the PCB.

8. The method of claim 5, further comprising decreasing an on-die de-capacitance (decap) of the wireline communications system.

9. The method of claim 5, further comprising lowering an I/O drive-strength of the memory interface.

10. The method of claim 5, in which the improved PCB trace length is greater than a standard trace length.

11. The method of claim 5, in which determining the time duration comprises the predetermined time duration of 2.0* the input/output operation speed of the memory interface.

12. The method of claim 5, in which the wireline communications system is integrated into a mobile phone, a set top box, a music player, a video player, an entertainment unit, a navigation device, a computer, a hand-held personal communications systems (PCS) unit, a portable data unit, a fixed location data unit, and/or an automotive electronic system.

13. A wireline communications system, comprising:
   a printed circuit board (PCB);
   a system on chip (SoC) die on the PCB; and
   an external memory device coupled to a memory interface of the SoC die through a signal integrity channel, in which a length of the signal integrity channel is configured to be a signal propagation length in time duration of 2.0*I/O speed.

14. The wireline communications system of claim 13, in which the memory interface comprises a low power double data rate (LPDDR) memory interface.

15. The wireline communications system of claim 13, in which the external memory device comprises a volatile memory device and/or a non-volatile memory (NVM) device.

16. The wireline communications system of claim 13, integrated into a mobile phone, a set top box, a music player, a video player, an entertainment unit, a navigation device, a computer, a hand-held personal communications systems (PCS) unit, a portable data unit, a fixed location data unit, and/or an automotive electronic system.

* * * * *